United States Patent Office 3,019,254
Patented Jan. 30, 1962

3,019,254
O-ACYL DERIVATIVES OF AMINO-ARALKYL-ENE-SUBSTITUTED HYDROQUINONES AND CATECHOLS
Milton Green, Newton Highlands, and Helen P. Husek, Lincoln, Mass., assignors to Polaroid Corporation, Cambridge, Mass., a corporation of Delaware
No Drawing. Filed Apr. 13, 1959, Ser. No. 805,673
12 Claims. (Cl. 260—479)

This invention relates to chemistry and more particularly to novel chemical compounds.

This application is in part a continuation of our copending application Serial No. 612,063, filed September 25, 1956, now abandoned.

A principal object of this invention is to provide novel derivatives of amino aralkylene-substituted hydroquinones and catechols, and, more particularly, O-acyl derivatives of such compounds.

Another object of this invention is to provide processes for preparing these compounds.

Other objects of the invention will in part be obvious and will in part appear hereinafter.

The invention accordingly comprises the products possessing the features, properties and the relation of elements which are exemplified in the following detailed disclosure, and the scope of the application of which will be indicated in the claims.

The copending application of Elkan R. Blout, Milton Green, Howard G. Rogers, Myron S. Simon and Robert B. Woodward, Serial No. 612,051, filed September 25, 1956, discloses certain novel amino aralkylene-substituted hydroquinones and catechols.

We have now discovered novel acyl derivatives of these compounds, which derivatives are very valuable chemical intermediates. These novel acyl derivatives may be represented by the formula:

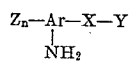

wherein Ar is an aryl nucleus, such as a benzene or naphthalene nucleus; each Z is an alkyl group, preferably a lower alkyl group of not more than five carbons, such as methyl or ethyl, or a halogen, such as chlorine; $n$ is 0, 1 or 2; X is an alkylene group, preferably an alkylene group containing no more than five carbons and more preferably an ethylene ($—CH_2CH_2—$) group; Y is a 2,5-bis-acyloxy, a 2,3-bis-acyloxy or a 3,4-bis-acyloxy phenyl group, which group may also be substituted by alkyl or halogen groups. By the term "acyloxy" is meant the grouping R—COO—, wherein R is an aliphatic group, preferably containing one to five carbons. In the preferred embodiment, R contains one carbon, and the acyloxy group is an acetoxy group. These compounds are preferably in the form of acid addition salts, such as the hydrohalide, e.g., the hydrochloride. If the compound is to be stored for any length of time, it is preferable to keep it in the form of the salt, e.g. hydrochloride, to prevent shifting of an acyl group from a hydroxyl group to the amino group.

The compounds of this invention may be prepared by reacting a dihydroxy compound of the formula:

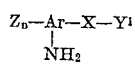

wherein Z, $n$, Ar and X are the same as above, and $Y^1$ is a 2,5-dihydroxy, 2,3-dihydroxy or 3,4-dihydroxy phenyl group, which group may be also substituted by alkyl or halogen groups, with the acyl chloride of the desired acyloxy group, in a reaction medium comprising the corresponding anhydrous acid which has been saturated with hydrogen chloride. The reaction is preferably performed at room temperature, but it is within the scope of this invention also to employ temperatures up to about 70° C. The particular conditions employed may vary according to the acyl halide and the acid employed. The dihydroxy starting material may be used as either the free amine or a salt thereof.

The following example is given to illustrate the preparation of compounds within the scope of this invention, and is intended to be illustrative only.

Example 1

Glacial acetic acid (180 cc.) is saturated with hydrogen chloride gas and acetyl chloride (180 cc.) is added. Aminophenethyl hydroquinone (45 g.) is then added and the mixture stirred at room temperature for two hours, at which time solution is complete. The reaction mixture is then poured into two liters of anhydrous ether. After several minutes of trituration the solvent is poured off and replaced by a liter of anhydrous ether. Trituration is continued intermittently, while cooling in a Dry Ice bath, until solidification is complete. The solid is filtered rapidly and then dried in a vacuum desiccator over potassium hydroxide, yielding 50 g. of p-(2,5-bis-acetoxy-phenethyl)-aniline hydrochloride of the formula:

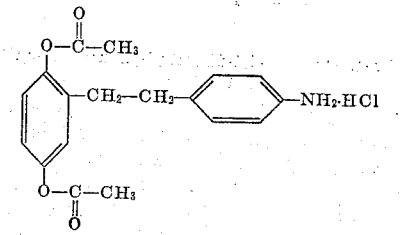

as a white crystalline solid melting at 153–157° C.
Analysis of this product gives:

|  | C | H | N | Cl |
|---|---|---|---|---|
| Calculated | 61.9 | 5.8 | 4.0 | 10.2 |
| Found | 61.4 | 6.1 | 4.0 | 9.8 |

The free amine may be obtained by dissolving the salt in water and adding sodium acetate.

The following are examples of additional compounds within the scope of this invention, and which may be prepared by following the process of the above example:

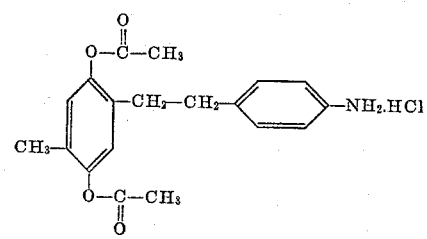

p-(2,5-bis-acetoxy-4-methyl-phenethyl)-aniline hydrochloride
(M.P. 174–6° C.)

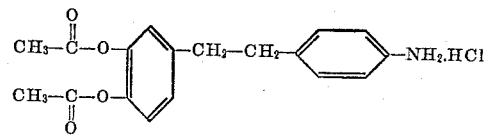

p-(3,4-bis-acetoxy-phenethyl)-aniline hydrochloride

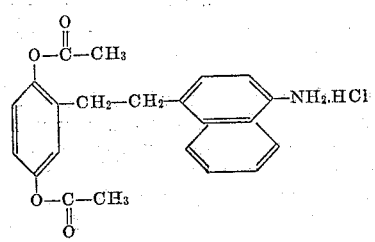

4-(2',5'-bis-acetoxy-phenethyl)-α-naphthylamine hydrochloride

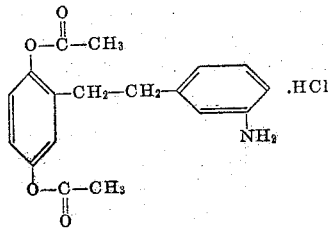

m-(2,5-bis-acetoxy-phenethyl)-aniline hydrochloride

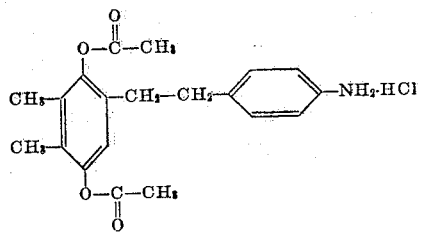

p-(2,5-bis-acetoxy-3,4-dimethyl-phenethyl)-aniline hydrochloride

As previously mentioned, the novel acyl derivatives of this invention are highly useful chemical intermediates. They are especially useful in reactions wherein it is desired that reaction be restricted to the amino group, and also where it is desired that the hydroxyl groups be protected during reaction and yet be readily regenerated after the reaction is completed.

In particular, the novel compounds of this invention are highly useful as intermediates in the preparation of azo compounds. It is well known that free hydroquinone groups will rapidly reduce diazonium salts. Thus it is practically impossible to diazotize an amino compound in the presence of a hydroquinone group. The novel compounds of this invention, however, may be readily diazotized and thus are highly valuable in the preparation of azo compounds, as, for example, in the preparation of azo compounds as disclosed and claimed in the copending application of Elkan R. Blout, Milton Green and Howard G. Rogers, Serial No. 612,045, filed September 25, 1956.

Since certain changes may be made in the above products without departing from the scope of the invention herein involved, it is intended that all matter contained in the above description shall be interpreted as illustrative and not in a limiting sense.

What is claimed is:

1. Chemical compounds selected from the group consisting of compounds within the formula:

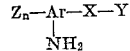

wherein Ar is an aryl nucleus selected from the class consisting of benzene and naphthalene nuclei; each Z is selected from the group consisting of halogen and alkyl groups; $n$ is selected from the group consisting of 0, 1 and 2; X is an alkylene group containing no more than five carbons; Y is selected from the group consisting of 2,5-bis-acyloxy phenyl, 2,3-bis-acyloxy phenyl, 3,4-bis-acyloxy phenyl and alkyl and halogen substituted derivatives thereof; said acyloxy groups being represented by

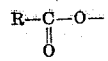

wherein R is aliphatic and contains from one to five carbons.

2. Chemical compounds as defined in claim 1 wherein Ar is a benzene nucleus.
3. Chemical compounds as defined in claim 1 wherein X is a —CH$_2$CH$_2$—group.
4. Chemical compounds as defined in claim 1 wherein the acyloxy groups of said Y are acetoxy.
5. Chemical compounds selected from the group consisting of the hydrohalide salts of the compounds defined in claim 1.
6. Chemical compounds selected from the group consisting of the hydrochloride salts of the compounds defined in claim 1.
7. p-(2,5-bis-acetoxy-phenethyl)-aniline hydrochloride.
8. p-(2,5-bis-acetoxy-4-methyl-phenethyl)aniline hydrochloride.
9. p-(3,4-bis-acetoxy-phenethyl)-aniline hydrochloride.
10. 4-(2',5'-bis - acetoxy - phenethyl)-α-naphthylamine hydrochloride.
11. m-(2,5-bis - acetoxy - phenethyl)-aniline hydrochloride.
12. p-(2,5-bis-acetoxy-3,4 - dimethyl-phenethyl)-aniline hydrochloride.

References Cited in the file of this patent

UNITED STATES PATENTS 2,906,736     Cassidy _____ Sept. 29, 1959

OTHER REFERENCES

Hickinbottom: "Reactions of Organic Compounds," pages 231–2, Longmans, Green & Co. (1948).